United States Patent Office 3,400,145
Patented Sept. 3, 1968

3,400,145
CYCLOPOLYSILOXANES
Tse C. Wu, Waterford, N.Y., assignor to General Electric Company, a corporation of New York
No Drawing. Filed Apr. 12, 1965, Ser. No. 447,541
11 Claims. (Cl. 260—448.2)

ABSTRACT OF THE DISCLOSURE

Cyclotrisiloxanes and cyclotetrasiloxanes which can be incorporated into a polysiloxane while still retaining the cyclic structure are encompassed by the formula:

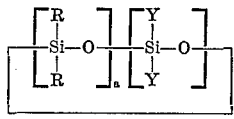

where R is a monovalent aryl radical, Y is selected from the group consisting of hydroxyl radicals and hydrolyzable radicals, and $a$ has a value of 2 or 3. Compounds within the scope of the present invention can be prepared by the reaction of:

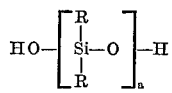

with $SiCl_4$. The cyclotrisiloxanes and cyclotetrasiloxanes of the present disclosure are useful in the manufacture of capacitors.

---

This invention relates to cyclic organopolysiloxanes. More particularly, it relates to cyclopolysiloxanes having the formula:

(1)

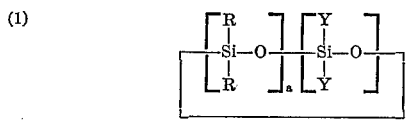

where R is a monovalent aryl radical, Y is selected from the group consisting of hydroxyl radicals and hydrolyzable radicals, and $a$ is an integral number of from 2 to 3, inclusive.

Polysiloxanes consisting of flexible, straight chain siloxane units are useful in many applications. However, they have been found to be lacking in certain desirable properties, such as mechanical strength, particularly at elevated temperatures. The flexibility of these polymers can be descreased and their strength and physical properties correspondingly improved, particularly at elevated temperatures, by the incorporation of a cyclic siloxane unit in the polymer chain. One method of accomplishing this incorporation is shown in my copending application, Ser. No. 299,153, filed Aug. 1, 1963, now U.S. Patent, 3,297,-632 and assigned to the same assignee as the present invention. That application describes and claims polymers which contain a group having the formula:

(2)

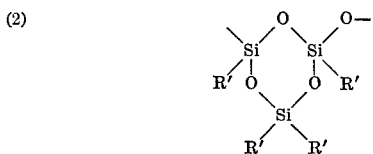

where R' is a monovalent hydrocarbon radical.

Another method has now been found of forming organopolysiloxanes having cyclic members in the ring, but a method whereby the cyclic member is incorporated in the chain via a single silicon atom in the ring, rather than through a —Si—O—Si— linkage within the cyclic member, as in my aforementioned application. This new method also provides decreased flexibilty, as mentioned in my previously described application and, in addition allows easier cross-linking of the chain via opening of the organopolysiloxane ring. In order to form these polymers, a new cyclopolysiloxane is necessary. The new cyclopolysiloxane is a compound wherein one silicon atom is di-substituted with hydrolyzable groups, the remaining silicon atoms in the compound being substituted with heat stable aryl radicals.

Briefly, this invention relates to cyclopolysiloxane having the formula:

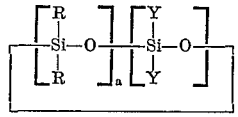

where R, Y, and $a$ are as previously defined. Among the radicals which R represents are phenyl, ortho-tolyl, meta-tolyl, para-tolyl, meta-trifluoromethylphenyl, ortho-trifluoromethylphenyl, para - trifluoromethylphenyl, cyanophenyl, benzoylphenyl, para-phenoxyphenyl, xylyl, ethylphenyl, naphthyl, biphenyl, etc. Among the hydrolyzable radicals which Y represents are lower alkoxy groups of the formula OR'', where R'' is an alkyl radical of from 1 to 7 carbon atoms; acyloxy radicals; aryloxy radicals; halide radicals and amine radicals.

The chlorine-substituted organopolysiloxanes of the present invention can be formed by the reaction of a polysiloxanediol and silicon tetrachloride according to the following reaction:

(3)

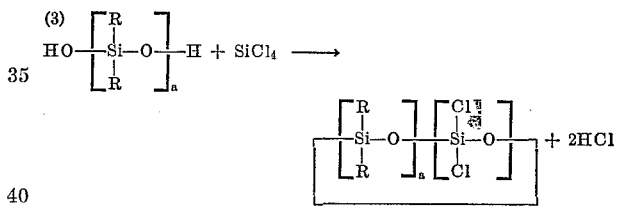

where R and $a$ are as previously defined. Similarly, the alkoxy-substituted cyclopolysiloxanes of the present invention can be formed according to a similar reaction where the silicon tetrachloride is replaced by a dialkoxy-dichlorosilane. On the other hand, the alkoxy-substituted cyclopolysiloxane and the other cyclopolysiloxanes substituted with groups different from chlorine can be formed by reaction of the chlorine-substituted cyclopolysiloxane which is formed according to reaction (3), as will be described later.

The hydrogen chloride generated according to reaction (3) can be removed in two ways. The preferred method of removing this by-product is by bubbling an inert gas, such as nitrogen, through the reaction solution for a time sufficient to sweep the hydrogen chloride from the material. Alternately, although the method is not preferred, a quantity of an acid acceptor, such as a tertiary amine, can be added to the reaction solution in an amount sufficient to absorb all of the hydrogen chloride generated in the reaction. Among the amine acid acceptors which can be thus utilized are pyridine, picoline, 1,4-diazabicyclo-(2,2,2)octane, and the dialkyl anilines. While the acid acceptors are utilizable, they are not preferred as the tendency to form bicyclic siloxane compounds, such as those of the formula:

(4)

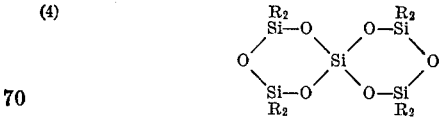

where R is as defined above, is significantly increased.

The reaction is conducted in a solvent solution and the solvents which can be utilized are essentially any organic material which is inert to the reactants under the conditions of the reaction. However, the preferred solvents are the hydrocarbons, such as benzene, toluene, xylene, pentane, hexane, heptane, etc. Polar solvents, such as the ethers and ketones, are usable, but do not provide as high a yield. When polar solvents are utilized with an amine acid acceptor, the yields can be reduced because these polar solvents tend to keep the acid acceptor-hydrogen chloride salt in solution during the process. When an acid acceptor is not utilized, there is a tendency to form undesirable by-products when polar solvents are utilized, as the solubility of hydrogen chloride is much higher in the polar solvents than in the hydrocarbon solvents, and the nitrogen sweep of the solution is, therefore, not as effective. Any of the utilizable solvents can be mixed, that is, one solvent can be used for one of the reactants and a different solvent for the other reactant.

Since it is theoretically possible to form either cyclopolysiloxanes or straight-chain organopolysiloxanes from the reactants utilized to form the materials of the present invention, the conditions must be so set that the formation of the cyclic compounds is favored. In general, the more dilute the solution, the more the formation of cyclics is favored. Thus, the final concentration should be limited to no more than about 2 moles of total reactants per liter of solvent, preferably no more than about 0.5 mole of total reactants per liter of solvent.

The order of addition of reactants varies depending upon whether an amine acid acceptor is utilized or a nitrogen sweep is employed to remove the hydrogen chloride from the solution. If an amine acid acceptor is employed, it is preferably dissolved in a portion of the solvent. To this solvent-amine solution are added two solutions, of equal volume, containing the reactants. When a nitrogen sweep is employed, the polysiloxanediol is preferably dissolved in a solvent, the silicon tetrachloride rapidly added to this solution, and the nitrogen sweep begun.

The product of the present invention can be formed with from a stoichiometric ratio of 1:1 of the two reactants shown in Equation 3 to a large excess of the silicon tetrachloride, that is a mole ratio of 5:1, or even more. Preferably, the mole ratio of silicon tetrachloride to polysiloxanediol is from about 1.5:1 to 2:1. Again, the reaction can be carried out at any temperature from about 10° C. to the boiling point of the solution in which the reaction is carried out. Preferably, however, the reaction is conducted at room temperature, for convenience and economy, because the reaction is accomplished relatively quickly, even at room temperature.

After the reaction is completed, the solvent is removed by evaporation and the resultant compound is further purified. The purification is accomplished by either a vacuum distillation, such as a molecular distillation, or by recrystallization from hydrocarbon solvents such as pentane, petroleum ether, hexane, and cyclohexane.

The formation of the cyclopolysiloxanes of the present invention will now be described in greater detail. These examples should be considered as illustrative only, and not as limiting in any way the full scope of the invention as covered in the appended claims.

In several of the following examples tolyl-substituted polysiloxanediols are utilized. The preparation of these materials will now be illustrated by the preparation of sym-tetra-m-tolyldisiloxanediol. All parts are by weight. A solution containing 500 parts of diethyl ether, 120 parts of sodium bicarbonate, and a small quantity of water were placed in a reaction vessel. To the vessel was added a second solution containing 126.8 parts of sym-di-chloro-tetra-m-tolyldisiloxane in 250 parts of ether, over a period of 1.5 hours. The resulting slurry was stirred at room temperature for 18 hours, filtered, and the filtrate placed in a flash evaporator to remove the solvent. A 95% yield of crude product melting at 60°–68° C. was obtained.

The crude product was recrystallized twice from petroleum ether and gave a material having the formula:

(5)

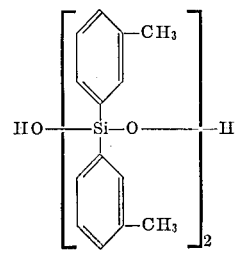

which had a melting point of 68.5°–69.5° C. By a similar procedure, sym-tetra-p-tolyldisiloxanediol was prepared with a 78% yield of a pure product melting at 100.5°–102.5° C. The structures of each of the tolyl-substituted disiloxanediol were substantiated by infrared analysis. Further, hexa-p-tolyltrisiloxane-1,5-diol was prepared and had a melting point of 139°–141° C.

Preparation of 1,1-dichloro-3,3,5,5-tetraphenyl-cyclotrisiloxane

EXAMPLE 1

A solution containing 200 ml. of benzene and 12 ml. (0.15 mole) of pyridine was placed in a reaction vessel equipped with two dropping funnels. Into one of the funnels was placed a 150 ml. solution containing 20.7 g. (0.05 mole) of sym-tetraphenyldisiloxanediol in benzene. In the second funnel was placed a 150 ml. solution containing 6.5 ml. (0.06 mole of silicon tetrachloride in benzene. The solutions were added simultaneously, at the same rate, over a period of 1.5 hours to the reaction vessel, at room temperature. The resulting mixture was stirred for 5 hours at room temperature and then allowed to stand overnight. Most of the pyridine hydrochloride was removed by filtration, the resulting filtrate distilled in a steam bath to remove the benzene and then vacuum distilled to remove the remaining benzene and pyridine. The residue was dissolved in toluene, the solution filtered to remove additional solids and the filtrate distilled to remove the toluene. An amount of 4 g. of product (corresponding to approximately a 16% yield based on the theoretical) was obtained boiling at 205°/0.25 mm. to 216° C./0.5 mm. The impure product was washed with petroleum ether an dried and yielded a material having the structure:

(6)

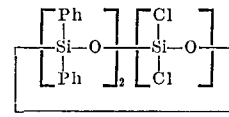

where Ph is a phenyl radical. The melting point of the pure material was 83°–85° C. An infrared spectrum of the product substantiated this structure. The percentage of hydrolyzable chlorine was determined to be 13.3%, corresponding well with the theoretical percentage of 13.86.

EXAMPLE 2

Into a reaction vessel were placed 120 ml. (1.5 moles) of pyridine and 1,000 ml. of benzene. Two solutions were prepared, the first containing 207.3 g. (0.5 mole) of sym-tetraphenyldisiloxanediol in benzene to a total volume of 1000 ml. and a second solution containing 62.3 ml. (0.55 mole) of silicon tetrachloride in benzene to a total volume of 1000 ml. The two solutions were added simultaneously, at about the same rate, with stirring, to the benzene-pyridine mixture over a period of 1.5 hours. Following addition, the mixture was stirred for an additional 5 hours at room temperature and then allowed to stand overnight. The reaction mixture was filtered twice and the filtrate then distilled on a steam bath to remove the solvent. A white precipitate formed in the residue from the distillation on standing overnight.

The precipitate was separated by filtration and dried, yielding 14.6 g. of white solids. This was identified as the material of Formula 4 where R is phenyl. The remaining filtrate was then vacuum distilled and yielded 46.2 g. (18% based on the theoretical) of material boiling at from 190° to 192° C. at 0.06 mm. The material had the same structure as that of Example 1.

EXAMPLE 3

In this example, the pyridine was eliminated and bubbling nitrogen was instead used to sweep the generated hydrogen chloride from the reaction solution. Additionally, the molar ratio of silicon tetrachloride to the disiloxanediol was approximately 2:1. A significant increase in yield resulted. Into a reaction vessel were placed 500 ml. of benzene and 41.4 g. (0.1 mole) of of sym-tetraphenyldisoloxediol. The contents of the vessel were stirred, at room temperature, until the disiloxanediol dissolved. To the solution was added, in about 1 minute, 22.6 ml. (ca. 0.2 mole) of silicon tetrachloride. The resulting solution was stirred while nitrogen was bubbled through it for a period of about 16 hours. The solvent was evaporated in a steam bath while the reaction vessel was placed under a slight vacuum. The residue was vacuum distilled yielding 31.4 g. (61.4% based on the theoretical) of the product of Example 1. The material boiled at from 204° C. at 0.15 mm. to 213° C. at 0.4 mm. There was no evidence of the formation of the spirobicyclic compound of Formula 4.

EXAMPLE 4

A first solution was prepared containing 82.8 g. (0.2 mole) of sym-tetraphenyldisiloxanediol in benzene to a tatal volume of 500 ml. A second solution was prepared containing 33 ml. (0.29 mole) of silicon tetrachloride in benzene, also to a total volume of 500 ml. The two solutions were added at the same rate, at room temperature, to a reaction vessel over a period of 35 minutes. A stream of nitrogen was bubbled through the reaction mixture during the addition and the mixture was stirred, at room temperature, while continuing the nitrogen feed, for a period of about 19 hours. The solvent was removed from the mixture by distillation and the residue was vacuum distilled yielding 30.5 g. (30% based on the theoretical) of material boiling at 199° C. at 0.14 mm., 207° C. at 0.22 mm., and 210° C. at 0.3 mm. On standing at room temperature, the material crystallized. A hydrolyzable chlorine analysis showed 13.38%, corresponding well with the 13.86% theoretical chlorine value of the material of Example 1.

EXAMPLE 5

In a reaction vessel, a solution was prepared containing 41.4 g. (0.1 mole) of sym-tetraphenyldisiloxanediol and 500 ml. of benzene. Over a period of about 1 minute, 22.6 ml. (0.2 mole) of silicon tetrachloride was added. The reaction mixture was stirred for about 24 hours while a stream of nitrogen was bubbled through the mixture to remove the hydrogen chloride formed. The solvent was removed from the solution by flash evaporation and the residue was vacuum distilled to give 43.2 g. (84% based on the theoretical) of the product of Example 1, boiling at 173°–188° C. at 0.007 mm. The melting point of this crude material was 78°–84° C.

Preparation of 1,1-dichloro-3,3,5,5,7,7- hexaphenyl-cyclotetrasiloxane

EXAMPLE 6

Into a reaction vessel were placed 30 ml. (0.37 mole) of pyridine and 500 ml. of benzene. Two solutions were added simultaneously, at the same rate to the reaction vessel. The first solution consisted of 20 ml. (0.18 mole) of silicon tetrachloride in benzene, with a total volume of 350 ml. The second solution, also with a total volume of 350 ml., consisted of a benzene solution containing 75 ml. of diethyl ether and 92 g. (0.15 mole) of sym-hexaphenyltrisiloxanediol. The addition was carried out over a period of about 1 hour, at room temperature, with stirring. The resulting slurry was filtered and the filtrate distilled to remove the solvent. The residue was heated in a vacuum, resulting in the sublimation of a portion onto the walls of the reaction vessel. These sublimed crystals melted at from 105°–107° C. and consisted of 2.2 g. of a product having the formula:

(7) 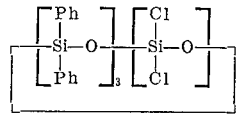

where Ph is phenyl. The structure of this product was substantiated by infrared analysis. Further, the hydrolyzable chlorine content was determined by titrating the material with a solution of potassium hydroxide in methanol. The percent chlorine found was 9.87%, corresponding well with the theoretical percentage of 10.2.

EXAMPLE 7

Into a reaction vessel were placed 40 ml. (0:51 mole) of pyridine and 200 ml. of benzene. A first solution was prepared in an amount of 500 ml. consisting of 22.6 ml. (0.2 mole) of silicon tetrachloride in benzene. A second solution was prepared, also in an amount of 500 ml., consisting of 122.6 g. (0.2 mole) of sym-hexaphenyltrisiloxanediol in benzene. The trisiloxanediol was kept in solution by heating the materials. The two solutions were added simultaneously, at the same rate, to the pyridine-benzene mixture over a period of 90 minutes, with stirring. The mixture was then stirred for an additional 5 hours at room temperature and allowed to stand overnight. The reaction mixture was filtered by suction and the filtrate distilled to remove the benzene solvent. The residue was stirred in a large amount of cold petroleum ether resulting in the precipitation of the desired product. The crude product, having the same formula as shown in Example 6, was obtained in an amount of 30 g. (21% based on the theoretical). The crude product melted at about 90°–120° C., and could be purified by vacuum sublimation to a pure 1,1-dichloro-3,3,5,5,7,7-hexaphenylcyclotetrasiloxane.

Preparation of 1,1-dichlorocyclopolysiloxane containing tolyl radicals

EXAMPLE 8

In a reaction vessel was placed a solution containing 23.5 g. (0.05 mole) of sym-tetra-p-tolyldisiloxanediol in 250 ml. of benzene. A quantity of 11 ml. (0.1 mole) of silicon tetrachloride was added to the solution over a period of 2 minutes. Nitrogen was then bubbled through the reaction mixture to carry off the generated hydrogen chloride, the bubbling continuing over a period of 8 hours, and the solvent was then distilled from the mixture. The residue was vacuum distilled and gave two fractions, 10.6 g. recovered at 222°–235° C. at 0.01 mm. This amounted to a crude yield of 37% of a product having the formula:

(8) 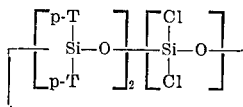

where p-T is the para-tolyl radical. The structure of this material was substantiated by an infrared spectra. A small sample of the product was titrated with potassium hydroxide in methanol and showed a chlorine content of 12.95%, corresponding well with the theoretical chlorine content of 12.49%.

EXAMPLE 9

Into a reaction vessel was placed a solution containing 47.1 g. (0.1 mole) of sym-tetra-p-tolyldisiloxanediol in 500 ml. of benzene. To this was added 22.6 ml. (0.2 mole) of silicon tetrachloride over a period of 2 minutes. The reaction mixture was stirred and nitrogen was bubbled through it for a period of 8 hours to drive out the generated hydrogen chloride. The solvent was then evaporated from the reaction mixture in a flash evaporator and the residue was vacuum distilled in a microdistillation apparatus yielding a fraction weighing 25 g. (44% based on the theoretical) of a material boiling at 212°–237° C. at 0.02 mm. and having the same structure as the material of Example 8. An infrared spectrum of the product showed it to be essentially the same as that of Example 8.

EXAMPLE 10

A solution containing 35.3 g. (0.075 mole) of sym-tetra-p-tolyldisiloxanediol in 200 ml. of benzene was placed in a reaction vessel. A quantity of 17 ml. (0.15 mole) of silicon tetrachloride was added rapidly to the solution in the reaction vessel, with stirring. A nitrogen stream was started through the reaction mixture and continued for a period of 28 hours, while stirring was continued. The benzene was removed by flash evaporation and the residue was vacuum distilled to yield 14.1 g. (33% based on the theoretical) of a material boiling at 224°–249° C. at 0.02 mm. and having the same structure as the material of Example 8.

EXAMPLE 11

In this example, the meta-tolylcyclotrisiloxane was produced. Into a reaction vessel was placed a solution containing 47.1 g. (0.1 mole) of sym-tetra-m-tolyldisiloxanediol in 500 ml. of benzene. To this was added, over a period of 5 minutes, 22.6 ml. (0.2 mole) of silicon tetrachloride. The reaction mixture was stirred for 12 hours, at room temperature, while nitrogen was bubbled through to carry away the generated hydrogen chloride. The benzene was removed from the reaction mixture by flash evaporation and the residue was vacuum distilled to give 17.1 g. (30% based on the theoretical) of a product boiling at 244°–248° C. at 0.02 mm. and having the structure:

(9) 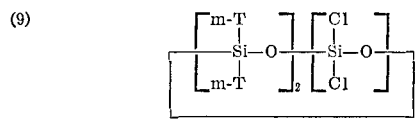

where m-T is the meta-tolyl radical. This structure was substantiated by infrared analysis.

EXAMPLE 12

Into a reaction vessel is placed a solution containing 69.6 g. (0.1 mole) of hexa-p-tolyltrisiloxane-1,5-diol in 500 ml. of benzene. To this is added, over a period of 5 minutes, 22.6 ml. (0.2 mole) of silicon tetrachloride. The reaction mixture is stirred for 10 hours, at room temperature, while nitrogen is bubbled through to carry off the generated hydrogen chloride. The benzene is removed by flash evaporation and the residue is distilled to yield a product having the formula:

(10) 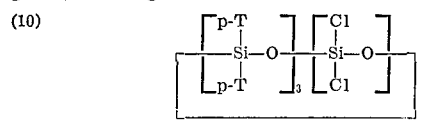

where p-T is the para-tolyl radical.

1,1-dialkoxycyclopolysiloxanes

EXAMPLE 13

In this example, the alkoxy-substituted cyclopolysiloxane was produced directly by the reaction of a polysiloxanediol and a dichlorodialkoxysilane. A mixture containing 12 ml. (0.14 mole) of pyridine and 200 ml. of benzene was placed in a reaction vessel. Two solutions were prepared: the first solution consisted of 180 ml. containing 9.5 g. (0.05 mole) of diethoxydichlorosilane in benzene and the second solution consisted of 180 ml. containing 30.6 g. (0.05 mole) of hexaphenyltrisiloxane-1,5-diol in benzene. The two solutions were added simultaneously, at the same rate, with stirring, to the reaction vessel over a period of about 1 hour. Stirring was continued for 2 more hours and the reaction mixture was allowed to stand. The mixture was then filtered to remove the pyridine hydrochloride and the filtrate was distilled to remove benzene. The remaining material was washed in petroleum ether and then recrystallized twice from ethanol to yield 26 g. (71% based on the theoretical) of a material having the structure:

(11) 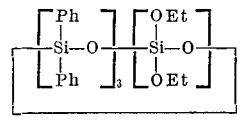

where Ph is the phenyl radical and OEt is the ethoxy radical. The material had a melting point of 115°–116° C. The composition of the product was substantiated by an infrared spectrum which showed bands at 7.2 microns, 8.6 microns, 9.1 microns, 9.25 microns, and 10.2 microns, the result of the —SiOEt structure.

EXAMPLE 14

In this example, the alkoxy-substituted cyclopolysiloxane was prepared by the alkoxylation of a previously prepared dichlorocyclopolysiloxane. Into a reaction vessel were placed 3.3 ml. (0.04 mole) of pyridine, 1.3 g. (0.04 mole) of methanol, and 50 ml. of diethyl ether. A solution containing 10.2 g. (0.02 mole) of 1,1-dichloro-3,3,5,5-tetraphenylcyclotrisiloxane in 50 ml. of diethyl ether was added dropwise, at room temperature, over a period of 30 minutes to the mixture in the reaction vessel. Following addition, the reaction mixture was stirred for an additional 3 hours and then filtered to remove the pyridine hydrochloride. The filtrate was distilled at reduced pressure to remove the ether solvent. After washing in petroleum ether, the residue had a melting point of 83°–87° C. and had the structure:

(12) 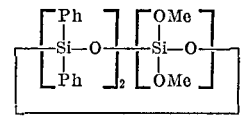

where Ph is the phenyl radical and OMe is the methoxy radical. An infrared spectrum was run following washing in ethanol and showed bands at 3.6 and 8.4 microns, indicative of the —SiOMe structure, in addition to the cyclotrisiloxane bands.

Preparation of hydroxy-substituted cyclopolysiloxane

EXAMPLE 15

The hydroxy-substituted cyclopolysiloxane was prepared here by the reaction of a dichloro-substituted cyclotrisiloxane and water in the presence of sodium bicarbonate. A slurry containing 2 g. of sodium bicarbonate, 50 ml. of diethyl ether, and 2 drops of water was formed in a reaction vessel. A solution containing 1.5 g. of 1,1-dichloro-3,3,5,5-tetraphenylcyclotrisiloxane in 30 ml. of diethyl ether was added rapidly to the slurry, resulting in gas evolution. The mixture was stirred for an additional hour and then allowed to stand overnight. The insoluble inorganic salt was removed by filtration and the filtrate was distilled to give a viscous residue. The material was soluble in ethanol, benzene, and methanol, insoluble in petroleum ether, and moderately soluble in cyclohexane. The melting point of the material was about 60° C. The structure:

(13)
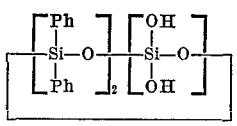

where Ph is the phenyl radical, was substantiated by an infrared spectrum which showed both the silanol band and the cyclotrisiloxane band.

EXAMPLE 16

In this example, the hydroxy-substituted cyclopolysiloxane was prepared by the hydrolysis of the dichloro-substituted cyclopolysiloxane in the presence of aniline. Into a reaction vessel were placed 3.72 g. (0.04 mole) of aniline, 0.72 g. (0.04 mole) of water, and 100 ml. of diethyl ether. To this was added a solution containing 10.2 g. (0.02 mole) of 1,1-dichloro-3,3,5,5-tetraphenyl cyclotrisiloxane dissolved in 70 ml. of diethyl ether, over a period of 30 minutes. The addition was carried out within a temperature range of —10° C. to 0° C. in a Dry Ice-acetone bath kept at about —20° C. Following completion of the addition, the reaction mixture was stirred for 20 minutes without a cooling bath and the mixture was then filtered to remove the aniline-hydrochloride. The filtrate was allowed to evaporate overnight and resulted in a mixture of white crystals, gummy solids, and oily material. The white crystals were removed from the mixture and were found to have a melting point of 65°–75° C. These crystals consisted chiefly of a product having the same structure as the product of Example 15 as substantiated by an infrared spectrum which showed strong silanol bands and a strong cyclotrisiloxane band.

A quantity of the tetraphenylcyclotrisiloxane-1,1-diol was dissolved in toluene and heated in the presence of tin octoate. Water was continuously stripped from the heated mixture and make-up toluene was added. The heating was continued until no water was removed by distillation. The temperature was then raised to remove the toluene in a vacuum and a sticky residue formed which solidified, on cooling, to a hard resin. The structure of this material:

(14)
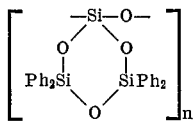

where Ph is the phenyl radical, was substantiated by an infrared spectrum which showed a broad band at 9–9.8 microns. This partly masked the cyclotrisiloxane band and further indicated that a portion of the siloxane rings had opened to cross-link the polysiloxane chains. A similar condensation reaction was conducted with a mixture of 5 g. of the tetraphenylcyclotrisiloxane-1,1-diol, 100 ml. of toluene, and 3 drops of a 28% tin octoate solution. Following 3 hours of distillation, the toluene was removed, and the intrinsic viscosity of the polymer was determined to be 0.02. Similarly, a polymerization with a small amount of potassium hydroxide at a temperature of 140°–145° C. yielded a polymer having an intrinsic viscosity of 0.02.

Thus, it can be seen that a series of new, reactive cyclopolysiloxanes has been disclosed. These cyclic siloxanes are valuable in the production of polymers with increased strength and decreased flexibility, particularly at high temperatures. For example, a quantity of tetraphenylcyclotrisiloxane-1,1-diol produced in Example 15 is dissolved in toluene and heated in the presence of tin octoate. Polymerization is effected, resulting in a toluene solution of a material having the structure of Formula 14. A roll formed from sheets of aluminum foil interleaved with sheets of unbleached sulfate paper is impregnated by dipping in the toluene solution. The assembly is heated to remove the toluene and, on cooling, an operative capacitor is formed, the polysiloxane acting as an effective dielectric.

In addition, the cyclic compounds of the present invention are susceptible of ring opening to provide integral cross-linking. Thus, the cyclopolysiloxanes can be copolymerized with other siloxane materials to provide copolymers, for example copolymerizing from 0.01 to 99.9 percent of a cyclopolysiloxane of the present invention with from 99.9 to 0.1 percent of a silanol-terminated methylphenylpolysiloxane fluid.

The cyclopolysiloxanes of the present invention can also be used to form another, new type of polymer. This new polymer has the structure:

(15)
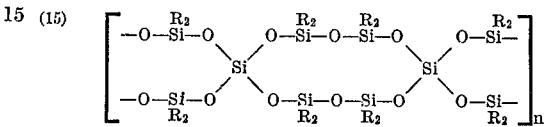

where R is as previously defined. When the previously described 1,1-dichloro-3,3,5,5 - tetraphenylcyclotrisiloxane is heated in the presence of water and sodium bicarbonate in a tetrahydrofuran solution, a bicyclic compound having the structure:

(16)
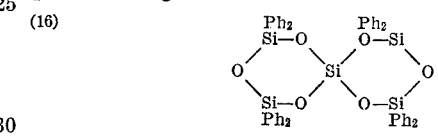

where Ph is the phenyl radical, is formed. For example, a solution containing 5.1 g. of the cyclotrisiloxane in 50 ml. of tetrahydrofuran was slowly added to a slurry containing 5 g. of sodium bicarbonate, 2 ml. of water, and 50 ml. of tetrahydrofuran, with stirring, at room temperature. The reaction mixture was filtered, the filtrate distilled, and the residue washed with methanol to yield 2.7 g. of a solid residue melting at about 250° C. This solid was soluble in toluene, dioxane, and tetrahydrofuran, but insoluble in alcohol and petroleum ether. The solid was recrystallized from cyclohexane and produced shiny crystals melting at 257°–258° C. with a molecular weight of 842, corresponding extremely well with the theoretical of 853. The silicon content, by elemental analysis, was found to be 16.43%, also corresponding extremely well with the theoretical value of 16.48%. A quantity of 0.3 g. of the spirobicyclic compound of Formula 16 was heated at 120° C. in the presence of 0.5 ml. of toluene and a few microdrops of a potassium hydroxide solution. After 2 hours stirring, the solvent was removed and a gummy residue resulted which solidified to a brittle solid. An infrared spectrum of the solid showed that the cyclotrisiloxane bands of the compound of Formula 16 had disappeared and that a broad band at 9.0–9.5 microns was present, indicating the presence of a higher cyclic or linear polymer such as the structure of Formula 15. The infrared analysis combined with the fact that the polymer was soluble in toluene was particularly indicative of the structure of Formula 15.

What I claim as new and desire to secure by Letters Patent of the United States is:

1. A cyclopolysiloxane of the formula:

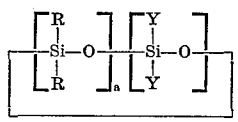

where R is a monovalent aryl radical, Y is selected from the group consisting of hydroxyl radicals and hydrolyzable radicals selected from the class consisting of lower alkoxy groups of the formula OR″, where R″ is an alkyl radical of from 1 to 7 carbon atoms; acyloxy radicals; aryloxy radicals; halide radicals and amine radicals, and $a$ is an integral number of from 2 to 3, inclusive.

2. The cyclopolysiloxane of claim 1, wherein R is phenyl.

3. The cyclopolysiloxane of claim 1, wherein R is tolyl.

4. The cyclopolysiloxane:

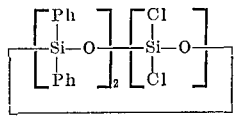

where Ph is the phenyl radical.

5. The cyclopolysiloxane:

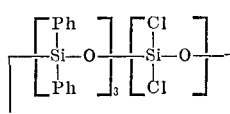

where Ph is the phenyl radical.

6. The cyclopolysiloxane:

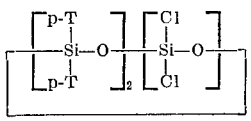

where p-T is the para-tolyl radical.

7. The cyclopolysiloxane:

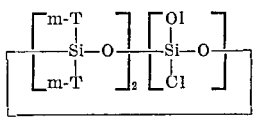

where m-T is the meta-tolyl radical.

8. The cyclopolysiloxane:

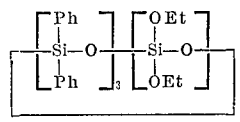

where Ph is the phenyl radical and OEt is the ethoxy radical.

9. The cyclopolysiloxane:

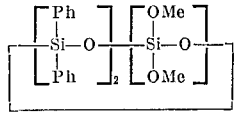

where Ph is the phenyl radical and OMe is the methoxy radical.

10. The cyclopolysiloxane:

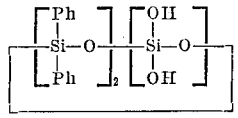

where Ph is the phenyl radical.

11. The cyclopolysiloxane:

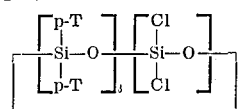

where p-T is the para-tolyl radical.

References Cited

UNITED STATES PATENTS

| | | | |
|---|---|---|---|
| 2,486,162 | 10/1949 | Hyde | 260—448.2 XR |
| 3,268,570 | 8/1966 | Weyenberg | 260—448.2 |
| 3,297,632 | 1/1967 | Wu | 260—448.2 XR |
| 3,328,448 | 6/1967 | Barnes et al. | 260—448.2 |

FOREIGN PATENTS 788,983  1/1958  Great Britain.

TOBIAS E. LEVOW, *Primary Examiner.*

P. F. SHAVER, *Assistant Examiner.*